(12) United States Patent
Urick

(10) Patent No.: US 7,224,265 B2
(45) Date of Patent: May 29, 2007

(54) AUTOMATIC REMOTE RETRACTABLE MIRRORS

(76) Inventor: Kirk B Urick, 1113 Hawk Creek Dr., Blue Springs, MO (US) 64015

( * ) Notice: Subject to any disclaimer, the term of this patent is extended or adjusted under 35 U.S.C. 154(b) by 48 days.

(21) Appl. No.: 10/986,266

(22) Filed: Nov. 10, 2004

(65) Prior Publication Data

US 2005/0162764 A1 Jul. 28, 2005

Related U.S. Application Data

(60) Provisional application No. 60/518,817, filed on Nov. 10, 2003.

(51) Int. Cl.
*B60Q 1/00* (2006.01)
(52) U.S. Cl. .............. 340/436; 340/686.6; 340/825.72
(58) Field of Classification Search .......... 340/686.6, 340/825.72, 426.1
See application file for complete search history.

(56) References Cited

U.S. PATENT DOCUMENTS

| | | | |
|---|---|---|---|
| 5,477,210 A * | 12/1995 | Belcher | 340/686.6 |
| 6,265,974 B1 * | 7/2001 | D'Angelo et al. | 340/568.1 |
| 6,754,565 B2 * | 6/2004 | Horbelt et al. | 701/1 |
| 6,847,288 B1 * | 1/2005 | Baschnagel, III | 340/426.1 |
| 2003/0026012 A1 * | 2/2003 | Pavao | 359/872 |
| 2004/0184170 A1 * | 9/2004 | Duroux et al. | 359/877 |

* cited by examiner

*Primary Examiner*—Jeffery Hofsass
*Assistant Examiner*—Hoi C. Lau
(74) *Attorney, Agent, or Firm*—Spencer Fare Britt & Brown

(57) ABSTRACT

An integrated (2) and remote transmitter (1) type device for catalyzing of a motor vehicle (9) accessory exterior rear view power fold mirrors (3) inward (4) toward the vehicle, and outward (5) to driving position, providing the operation of opening (6) and closing (7) the garage door (8) of said vehicle (9) during entering and exiting, with sustained catalyzing while parked in the garage, further including catalyzing the exterior rear view mirrors (3) inward (5) toward the vehicle and outward (4) to driving position away from transmitter (1) without pushing a button or without human intervention while in parking facilities.

4 Claims, 4 Drawing Sheets

AUTOMATIC REMOTE RETRACTABLE MIRRORS

RELATED APPLICATION

The present U.S. non-provisional patent application claims priority benefit of an earlier-filed U.S. provisional patent application titled A.R.R.M. (AUTOMATIC REMOTE RETRACTABLE MIRRORS)™, Ser. No. 60/518,817, filed Nov. 10, 2003.

BACKGROUND

The desire for retractable mirrors comes from several areas.
1. The addition, as a factory option, of extended length mirrors for towing, which will not fit through a standard garage door opening.
2. The need to retract the mirrors in off road driving applications.
3. The desire to retract the mirrors in a parking area for the convenience and protection of the mirror, as well as others.

Current OEM offerings include retractable mirrors (Power Fold) that are operated manually, both in motorized and non-motorized configurations. By providing means for automatic retraction of motorized mirrors, damage to the mirrors caused by driver inattentiveness could be reduced.

DESCRIPTION

The following describes in generic terms a method of retracting and extending the external mirrors on an automobile. This is one of several possible methods to achieve this and should not be construed to be the only, or the desired method. The following information is for illustrative purposes only and contains no specific information for manufacture.

The following is a physical description of the A.R.R.M. (Automatic Remote Retractable Mirrors).™., design to properly characterize the working functions of the product, as well as define the physical appearance. Based on the inventor's description and any pertinent additional research, typical use of the product, its basic design, and production materials are considered. In the next section, any possible modifications of use and design suggested by the inventor are briefly explored, along with production feasibility.

Figure 1:
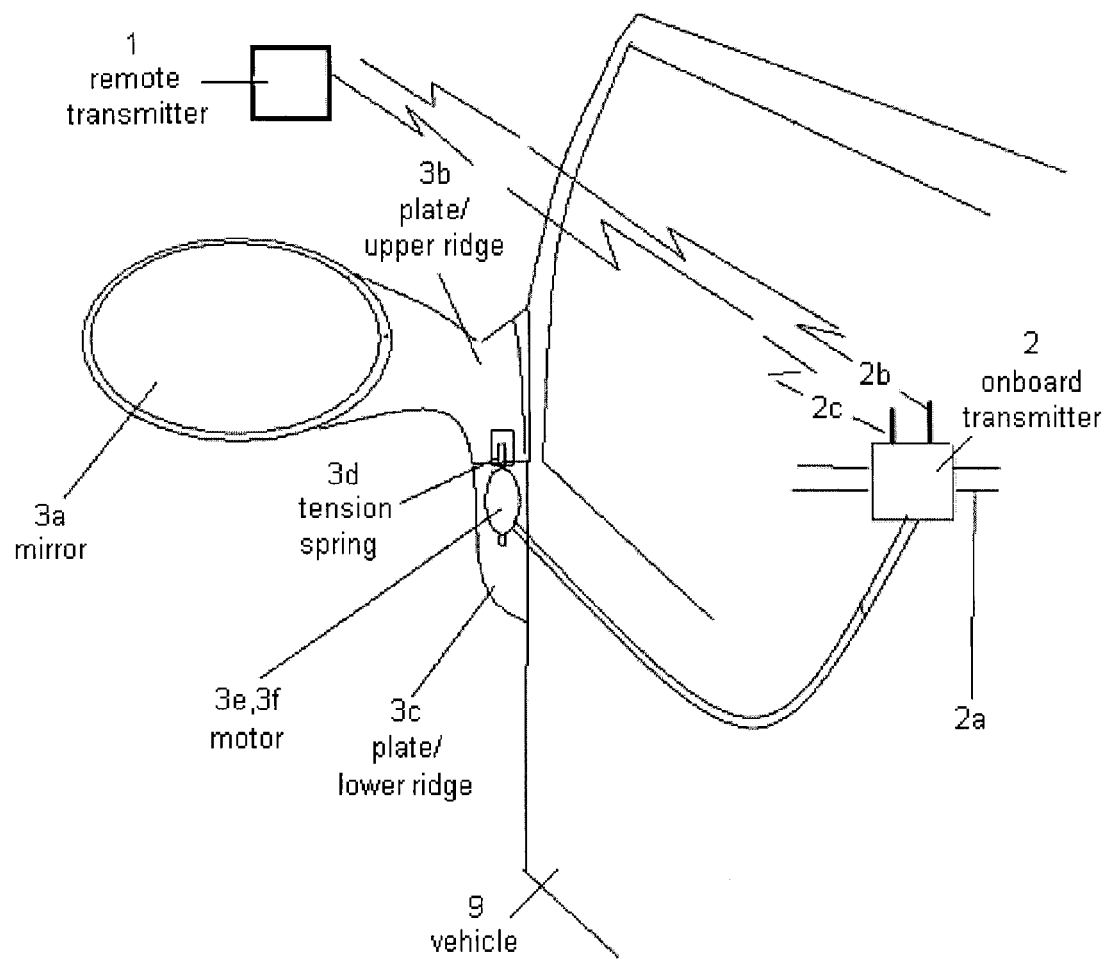
FIG. 1 is a depiction of a preferred embodiment of the system of the present invention for repositioning a vehicle's mirrors.

The A.R.R.M. (Automatic Remote Retractable Mirrors).™., are made in the dimensions that differ for the make and model of the vehicle for which they are assembled. Included in the device for after market applications are a digital sensor, a motor (3e, 3f), as well as plates (3b, 3c) that allow the device to rotate and retract automatically. (see FIG. 1)

Figure 3:
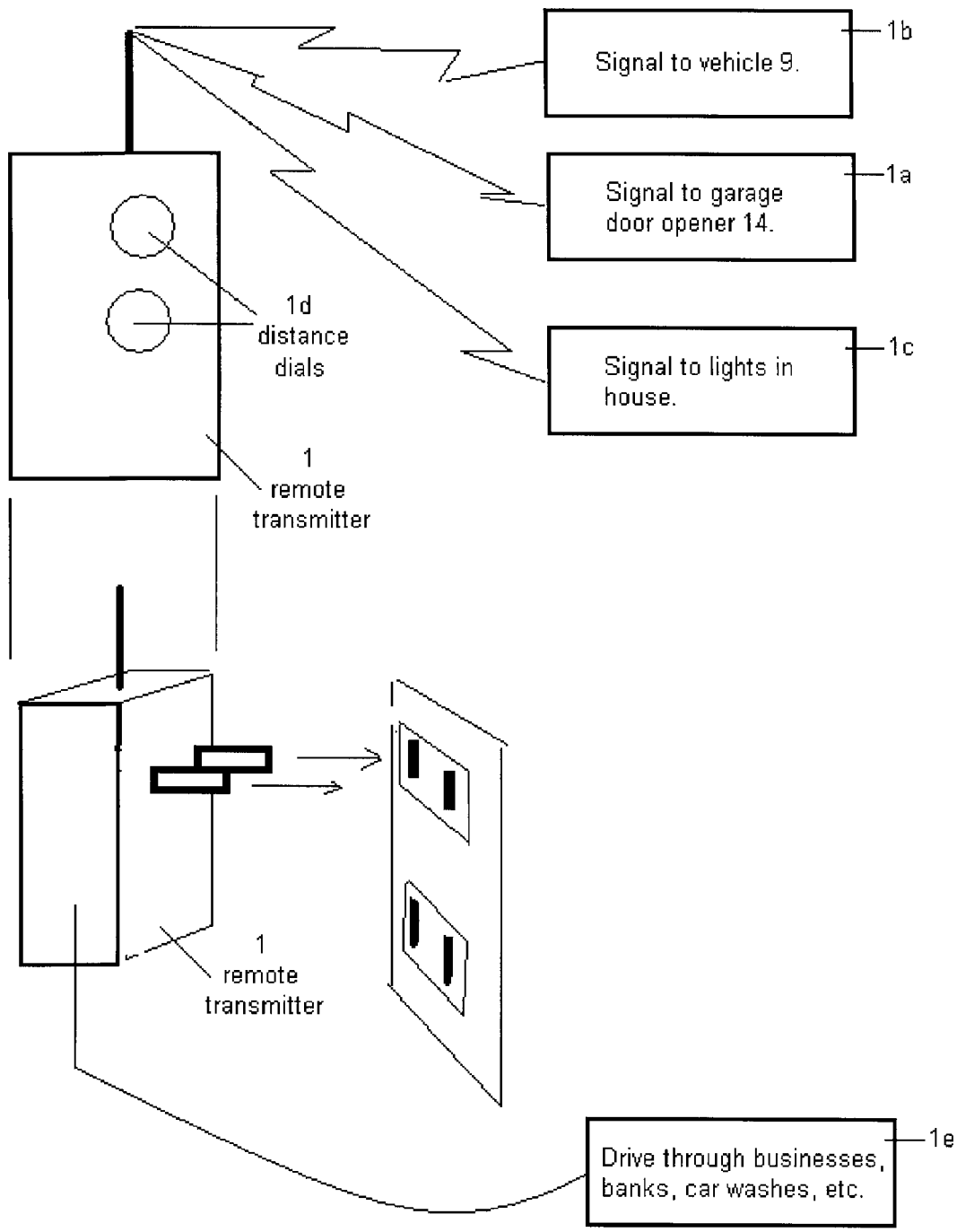
FIG. 3 is a depiction of a remote transmitter component of the system of FIG. 1.
Figure 4:
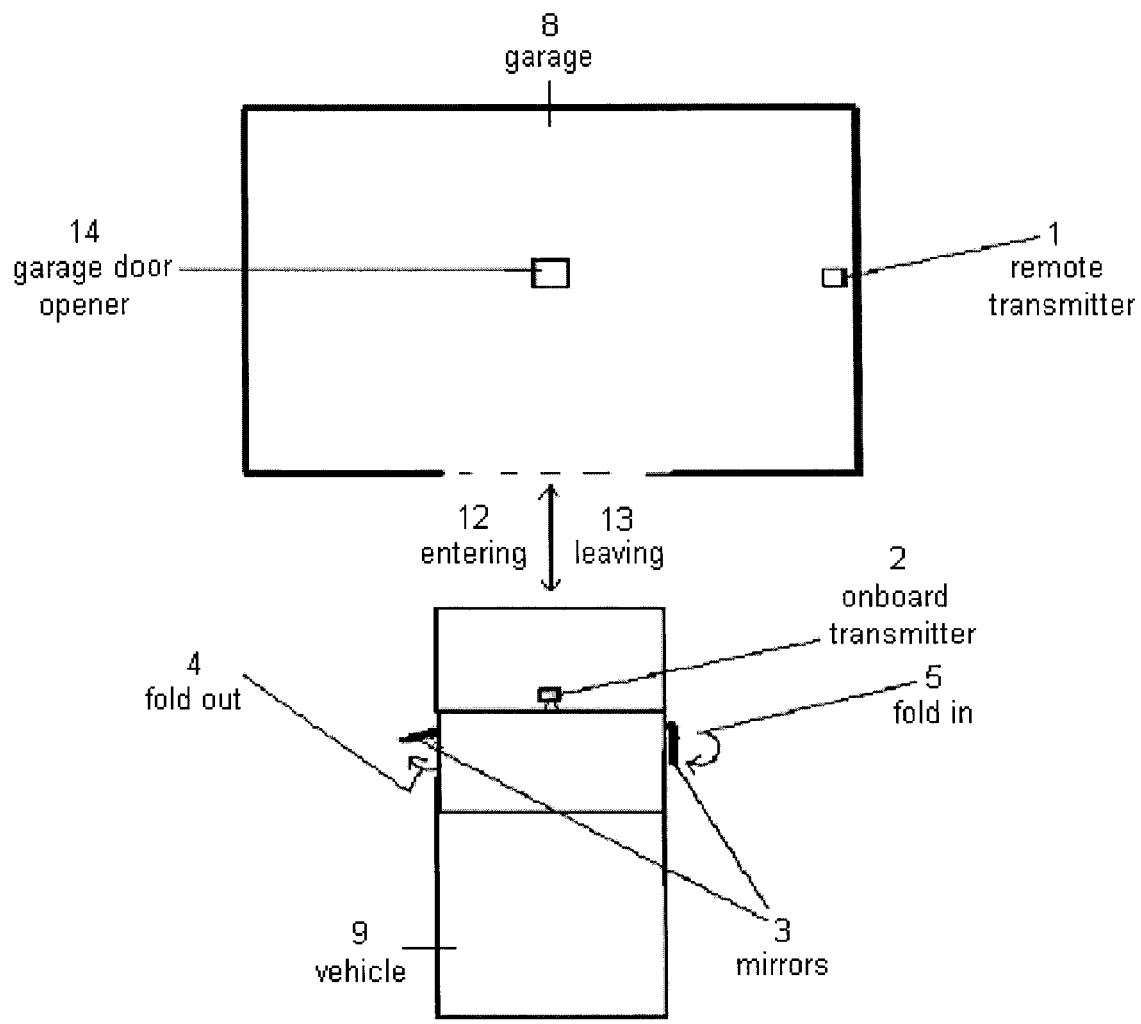
FIG. 4 is a plan view of the system of FIG. 1 in its operational environment, including the vehicle and a garage.

The A.R.R.M. (Automatic Remote Retractable Mirrors).™., have a connector that will attach to the electrical panel (2a) or computer system (2b4) of the vehicle (9). (see FIG. 2). There are three different options to use. The first would use a corresponding sensor (Transmitter (2c)/Receiver (2b)) (1) in the garage that is plugged into the wall (1). (see FIG. 3). This sensor reacts (2b2) to the sensor (Transmitter (2b)/Receiver (2c)) in the mirrors (after market) (2) or integrated within the vehicle (existing power fold mirrors) (2) (see FIG. 2), catalyzing the mirrors to/retract inward (5) during entering (12) the garage (8) and sustaining (1b)(see FIG. 4), as well as catalyzing the mirrors outward (4) exiting (13) the garage (8) after vehicle's MPU (2) is out of range (1e) of remote transmitter (1). The second would automatically retract the mirror (3) when the vehicle's transmission is put into park or three seconds after the vehicle's ignition is in the off position. By shifting the transmission or turning the vehicle back on will catalyze the mirrors (3) to the driving position. The third option would allow the use of a three way switch (2b1) including left/right or both to retract the mirrors manually in the event driver is trying to get into a "tight spot." (see FIG. 2) For after market applications there is a tension spring (3d) that keeps the upper and lower plates tight so the upper ridge (3b) and lower ridge (3c) will align, keeping the mirrors in their position and allowing break away and reset per existing manufacturer models. The A.R.R.M. (Automatic Remote Retractable Mirrors).™., are shaped like conventional exterior rear-view mirrors for existing vehicles. However, the size of the mirrors could possibly be larger to afford safety to elderly drivers and for vehicles that pull trailers.

The A.R.R.M. (Automatic Remote Retractable Mirrors)-m may be activated by satellite. "On Star" or other types of companies like this, could designate any stop such as stadium parking shopping centers, houses, airports, work places, etc., by catalyzing the mirrors accordingly.

The sensor (Transmitter/Receiver) plug in unit (see FIG. 3) that (1) is in the garage has four more possible functions:
1. Distance Dials (1d) as to how far away from the garage one would the mirrors to catalyze inward (5) while exiting (13) or outward (4) while entering (12) garage. (8)
2. The ability to open (6)(1a) and close (7)(1a) the garage door (8) without pressing a "garage door opener (14) button inside the vehicle".
3. Turn on lights in the house (receiver at wall plugs in house) (1c)
4. The Sensor (Transmitter/Receiver) in the garage could be battery operated.

However, a plug-in unit would be of greater benefit because of a more consistent signal to the garage door opener (14) as well as the vehicle's Sensor (Transmitter/Receiver) (2).

System.

Although, as stated in the general section, there are several methods to provide for automatic retraction of the mirrors (3). The following will concentrate on the use of a microprocessor (MPU) (2) (see FIG. 1), based unit to obtain the desired results. By using a MPU (2) several different methods of initiating automatic retraction can be realized from one unit.

Some examples are as follows:
Input from a manual switch (2b1).
Input from a remote switch mounted on structure (radio frequency [RF] (1) or Infrared [IR]).
Input from a key fob (2b5).
Input from vehicle electronic control unit (ECU).
Input from ignition switch. (the mirrors could be made to retract (5) automatically after a delay, following vehicle shut down. Much like the current OEM option for delayed headlight shut-off. Then mirror extend (4) at start up as the existing door lock activation).

Most or all of the options could be realized from one unit with the proper Software. An example system may consist of the following (see FIG. 2):

Printed circuit board (PCB) containing the MPU (2), power circuitry (2a), and output (2e) power management (2f). (FET or relays allowing the MPU (2) to drive the mirror motors)(3)

Receiver (RX)(2c) in the vehicle (RF or IR).

Figure 2:
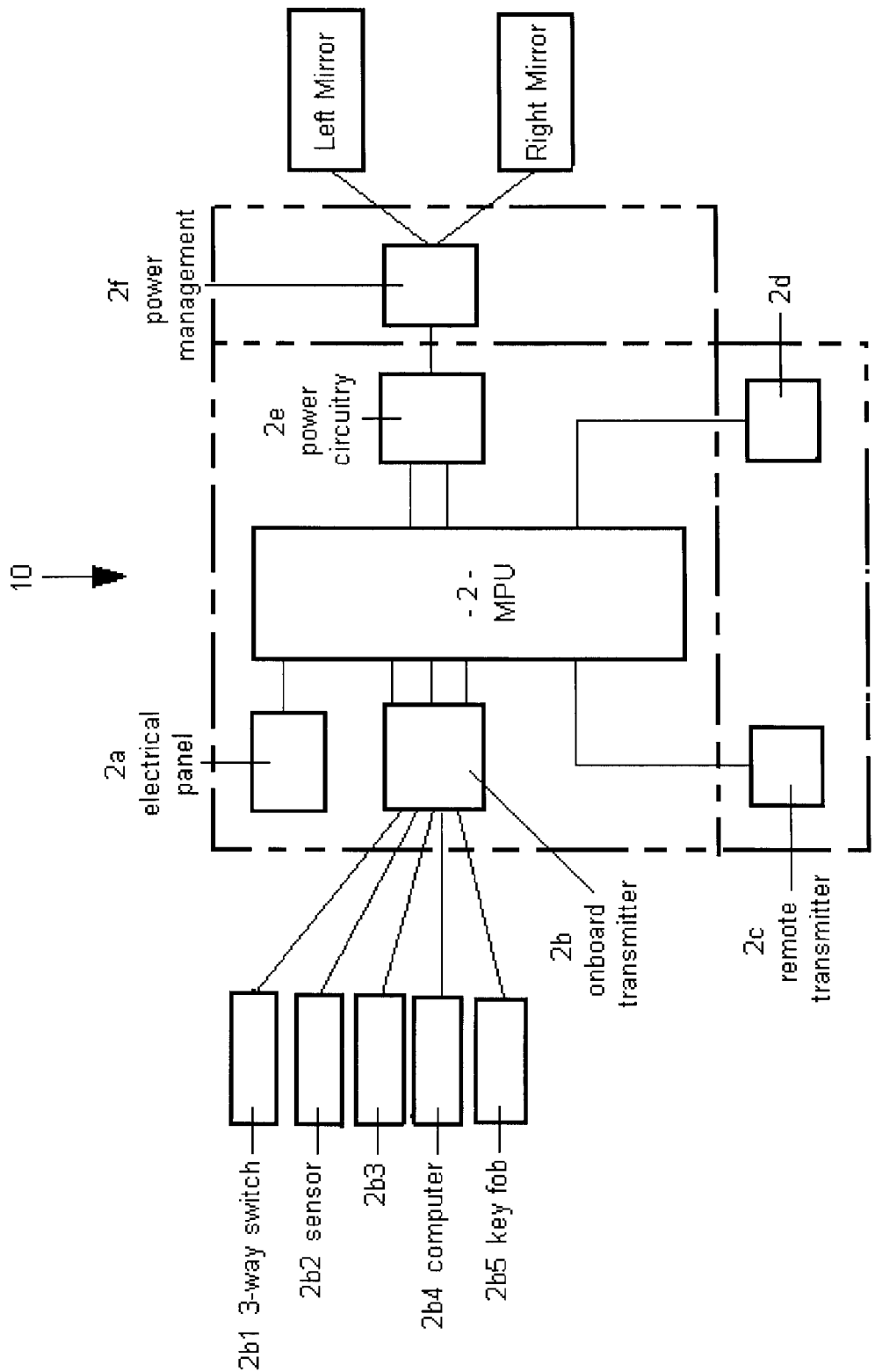
FIG. 2 is a block diagram showing components of the system of FIG. 1.

Transmitter (TX) on structure (1) or key fob (2b5)(see FIG. 2)

Manual Switch Assembly (2b1) (Possibly integrated with PCB for retraction and extension of the mirrors, as well as means to disable the automatic function.

With the system previously outlined, the mirrors (3) could be made to retract (5) when the vehicle (9) approaches a structure (parking garage, car wash, drive through bank or restaurant), when the fob is activated, through the use of a manual switch (2b1), and automatically when the vehicle is shut down with input from the ignition or the ECU. Provisions in the MPU (2) software could allow could allow for manual operation at any time, as well as filtering to reduce the possibility of false triggering from the remote inputs. With the addition of other inputs and outputs to the same MPU (2), further operations could be performed. A position sensor from the mirror assembly would allow for automatic extension. The addition of a coded transmitter (1) would allow the activation of remote operations (Opening a garage door (8), activation of house lights (1c), etc.) as well as communicating with the vehicle's MPU (2). These additions could be stand-alone or integrated into the MPU (2) PCB (10) which includes (2b1, 2b2, 2b3 and 3a). The MPU (2) PCB(10) which includes (2b1, 2b2, 2a and 3a) as a part of an integrated switch assembly would allow ease of OEM installation. The MPU (2) PCB (10) which includes (2b1, 2b2, 2b3) as a separate unit could also be offered as an after market retrofit to vehicles with existing motorized or Power Fold Mirrors. (see FIG. 1)(see FIG. 2).

Remote Inputs.

The system described previously uses the input of remote transmitters, receivers, and sensors to trigger automatic functions. These transmitters could range from a sophisticated, encrypted RF transmitter to a simple IR emitter. Both types have their benefits and drawbacks. A sophisticated transmitter would allow for security when used to activate remote operation, but may require installation service and may be more expensive. A simple transmitter would allow ease of installation, low cost, but would provide less security.

The invention claimed is:

1. A system comprising an onboard transmitter and a remote transmitter for repositioning motor vehicle accessory exterior rear view power fold mirrors inward toward the vehicle and outward to the driving position, and for opening and closing a garage door, wherein the onboard transmitter operates independently from the remote transmitter when the motor vehicle is out of range of the remote transmitter, and wherein the remote transmitter is contiguous within the frequency of the onboard transmitter for the purposes of opening and closing the garage door and repositioning the mirrors.

2. A system comprising an onboard transmitter and a remote transmitter for repositioning motor vehicle accessory exterior rear view power fold mirrors inward toward the vehicle and outward to the driving position, and for opening and closing a garage door, wherein the onboard transmitter operates independently from the remote transmitter when the motor vehicle is out of range of the remote transmitter, and wherein the remote transmitter is contiguous within the frequency of the onboard transmitter for the purposes of opening and closing the garage door and repositioning the mirrors, and wherein the remote transmitter is adjustable with regard to the distance at which repositioning takes place as the motor vehicle approaches and retreats from the garage door.

3. The system as in claim 1 adapted to the existing motor vehicle electrical and computer systems through a microprocessor and existing switches.

4. A system comprising an onboard transmitter and a remote transmitter for repositioning motor vehicle accessory exterior rear view power fold mirrors inward toward the vehicle and outward to the driving position, and for opening and closing a garage door, wherein the onboard transmitter operates independently from the remote transmitter when the motor vehicle is out of range of the remote transmitter, and wherein the remote transmitter is contiguous within the frequency of the onboard transmitter for the purposes of opening and closing the garage door and repositioning the mirrors, and wherein the system is expanded to a universal acceptance in that a universal signal from a independent remote transmitter repositions the mirrors inward at drive through businesses and outward after a distance of confidence is reached.

* * * * *